US012538979B2

(12) United States Patent
Sakai et al.

(10) Patent No.: US 12,538,979 B2
(45) Date of Patent: Feb. 3, 2026

(54) MUSIC STAND AND MUSICAL INSTRUMENT

(71) Applicant: CASIO COMPUTER CO., LTD., Tokyo (JP)

(72) Inventors: Otoya Sakai, Machida (JP); Takahiro Moriya, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 22 days.

(21) Appl. No.: 18/211,012

(22) Filed: Jun. 16, 2023

(65) Prior Publication Data

US 2023/0404255 A1 Dec. 21, 2023

(30) Foreign Application Priority Data

Jun. 20, 2022 (JP) ................................ 2022-098562

(51) Int. Cl.
*A47B 23/00* (2006.01)
*G10G 7/00* (2006.01)

(52) U.S. Cl.
CPC ............. *A47B 23/004* (2013.01); *G10G 7/00* (2013.01)

(58) Field of Classification Search
CPC ... G10G 7/00; G10C 3/00; G10C 3/02; G10C 3/10; A47B 23/004; A47B 23/042; A47B 19/002
USPC ....... 248/441.1, 443, 450, 453, 454; 84/180, 84/453, 472
See application file for complete search history.

(56) References Cited

U.S. PATENT DOCUMENTS 201,314 A * 3/1878 Warner ................ A47B 23/042 248/908
317,937 A * 5/1885 Fuller .................... A47B 19/04 248/447
2,557,399 A * 6/1951 Teetor ........................ G09F 1/14 211/DIG. 1
5,104,086 A * 4/1992 Ramey, III ........... F16M 11/046 248/442.2
6,050,536 A * 4/2000 Bicknese ................. G10G 7/00 248/443
7,266,918 B2 * 9/2007 Huenefeld .......... G09F 15/0006 40/604

(Continued)

FOREIGN PATENT DOCUMENTS

JP S48-093202 U 11/1973
JP S48-100257 A 12/1973

(Continued)

OTHER PUBLICATIONS

JPO; Application No. 2022-098562; Notice of Reasons for Refusal dated May 21, 2024.

*Primary Examiner* — Jonathan Liu
*Assistant Examiner* — Guang H Guan
(74) *Attorney, Agent, or Firm* — Fitch, Even, Tabin & Flannery LLP

(57) ABSTRACT

A music stand includes a plate having a through hole, a first member configured to be disposed on one side of a front surface or a back surface of the plate and having a projecting portion configured to pass through the through hole, and a second member configured to be disposed on another side of the front surface or the back surface of the plate and having a recessed portion corresponding to the projecting portion.

20 Claims, 12 Drawing Sheets

(56) References Cited

U.S. PATENT DOCUMENTS

| | | | | | |
|---|---|---|---|---|---|
| 7,576,272 | B2 * | 8/2009 | Houfek | G10G 7/00 | 84/180 |
| RE43,158 | E * | 2/2012 | Dill | B41J 29/18 | 248/473 |
| 9,468,291 | B2 * | 10/2016 | Nilsen | A47B 23/02 | |
| 10,636,393 | B2 * | 4/2020 | Yamashita | G10C 3/04 | |
| 10,796,675 | B1 * | 10/2020 | Turney | A47B 23/004 | |
| 11,322,121 | B2 * | 5/2022 | Futsuhara | G10G 1/00 | |
| 11,551,647 | B2 * | 1/2023 | Hoshino | A47B 23/004 | |
| 12,315,481 | B2 * | 5/2025 | Fukushima | G10G 7/00 | |
| 2006/0283308 | A1 * | 12/2006 | Houfek | G10G 7/00 | 84/453 |
| 2011/0186700 | A1 * | 8/2011 | Kao | F16M 13/00 | 248/201 |
| 2023/0404255 | A1 * | 12/2023 | Sakai | G10G 5/00 | |

FOREIGN PATENT DOCUMENTS

| | | | | |
|---|---|---|---|---|
| JP | S49-005504 | U | | 1/1974 |
| JP | 2004258499 | A | * | 9/2004 |
| JP | 2006308609 | A | * | 11/2006 |
| JP | 2007199185 | A | * | 8/2007 |
| JP | 2008040047 | A | * | 2/2008 |
| JP | 3158928 | U | | 4/2010 |
| JP | 2016-202732 | A | | 12/2016 |
| JP | 2021-015252 | A | | 2/2021 |
| JP | 2022-052297 | A | | 4/2022 |

* cited by examiner

MUSIC STAND AND MUSICAL INSTRUMENT

CROSS-REFERENCE TO RELATED APPLICATION

This patent application is based upon and claims the benefit of priority under 35 USC 119 of Japanese Patent Application No. 2022-098562 filed on Jun. 20, 2022, the entire disclosure of which, including the specification, claims, drawings and abstract, is incorporated herein by reference in its entirety.

BACKGROUND

Technical Field

The present invention relates to a music stand and a musical instrument.

Description of the Related Art

There have conventionally been provided music stands configured to be attached to a musical instrument such as a keyboard instrument or the likes. In general, a music stand includes a rectangular plate, a horizontal plate for supporting sheet music from below, and an attachment member for attaching the music stand to a keyboard instrument or the like, and these constituent members are assembled together so that sheet music can rest thereon while leaning against the plate. For example, Japanese Unexamined Patent Application Publication No. 2016-202732 (JP-A-2016-202732) discloses a music stand including slits which are provided in a rectangular plate, which is elongated in a left-right direction, so that two left and right corners of opened sheet music of a book type are received therein. This music stand includes the rectangular plate, a horizontal plate, and a plate-shaped attachment portion configured to be inserted into a keyboard instrument so as to fix the music stand.

SUMMARY

According to an aspect of the present disclosure, there is provided a music stand including a plate having a through hole, a first member configured to be disposed on one side of a front surface or a back surface of the plate and having a projecting portion configured to be passed through the through hole, and a second member configured to be disposed on another side of the front surface or the back surface of the plate and having a recessed portion corresponding to the projecting portion.

According to another aspect of the present disclosure, there is provided a musical instrument comprising the music stand.

DESCRIPTION OF THE EMBODIMENT

Figure 1:
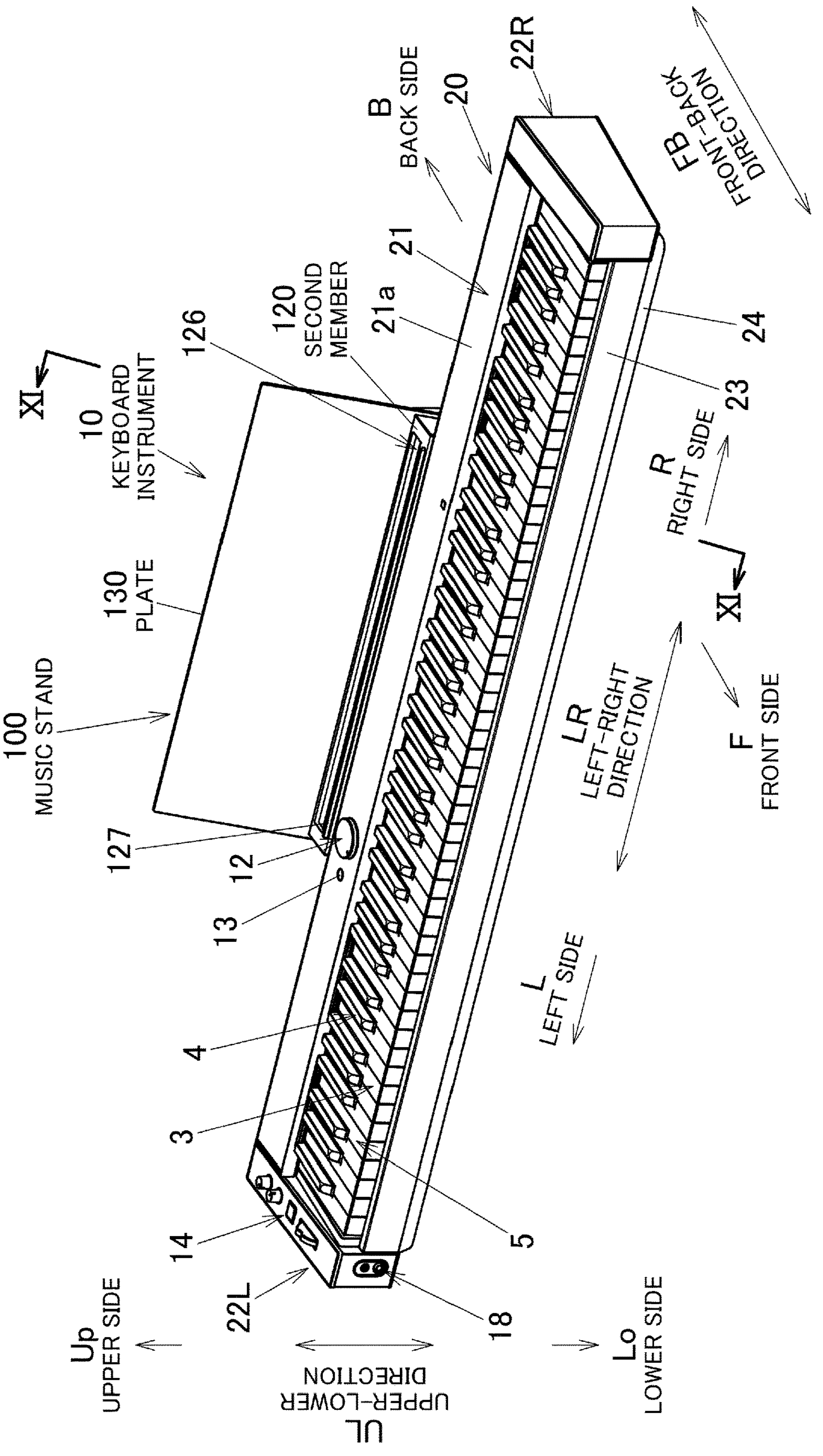
FIG. 1 is a perspective view of a keyboard instrument which is a musical instrument according to an embodiment of the present disclosure as viewed from a right upper front side thereof.

Hereinafter, an embodiment of the present disclosure will be described based on drawings. A keyboard instrument which is a musical instrument, shown in FIG. 1 includes a full-scale (88-note) keyboard 5 including plural white keys 3 and plural black keys 4, which make up a large number of keys or 88 keys of the keyboard 5, and a case 20, and a music stand 100 is attached to the keyboard instrument 10. In the following description, a side on, to, or relating to the front of the keys in the keyboard 5 in a front-back direction FB is referred to as a front side F, and a side on, to, or relating to the back of the keys in the keyboard in the front-back direction FB is referred to as a back side B. When facing the keyboard 5 from the front side F, a side on, to, or relating to a left-hand side of a spectator or a player is referred to as a left side L, and a side on, to, or relating to a right-hand side of the player is referred to as a right side R. In the keyboard 5, a direction in which the keys are aligned is a left-right direction LR. In addition, a side on, to, or relating to an upper direction of the keyboard instrument 10 in an upper-lower direction UL is referred to as an upper side Up, and a side on, to, or relating to a lower side of the keyboard instrument 10 in the upper-lower direction UL is referred to as a lower side Lo. In the present embodiment, while the keyboard instrument is described as an electronic keyboard instrument, a keyboard instrument main body may take the form of any other type of a keyboard instrument or other musical instruments.

As shown in FIG. 1, the case 20 has substantially a rectangular parallelepiped shape which is elongated in the left-right direction LR. An upper case 21 is provided on a back side B of the keyboard 5 in the case 20. An upper panel 21*a* is provided on an upper side Up of the upper case 21. A left-hand side case 22L and a right-hand side case 22R of the case 20 are provided individually at a left-hand side and a right-hand side of the keyboard 5. The left-hand side case 22L and the right-hand side case 22R are each provided in the form of a box shape which is elongated in the front-back direction FB. A plate-shaped front case 23 is provided between the left-hand side case 22L and the right-hand case 22R on the front side F. The left-hand side case 22L, the right-hand side case 22R, and the front case 23 are connected to a lower case 24.

A rotary knob 12 for controlling the volume of sound produced by the keyboard instrument 10 is provided in a position on the upper panel 21*a* which lies slightly closer to a left-hand side of the upper panel 21*a* than a center thereof. A power supply button 13 is provided on a left side L of the knob 12 on the upper panel 21*a*. A control section 14 including a pitch bender, push buttons, and the like is provided on an upper surface of the left-hand side case 22L. In addition, an earphone jack 18 is provided in a front surface of the left-hand side case 22L.

Figure 2:
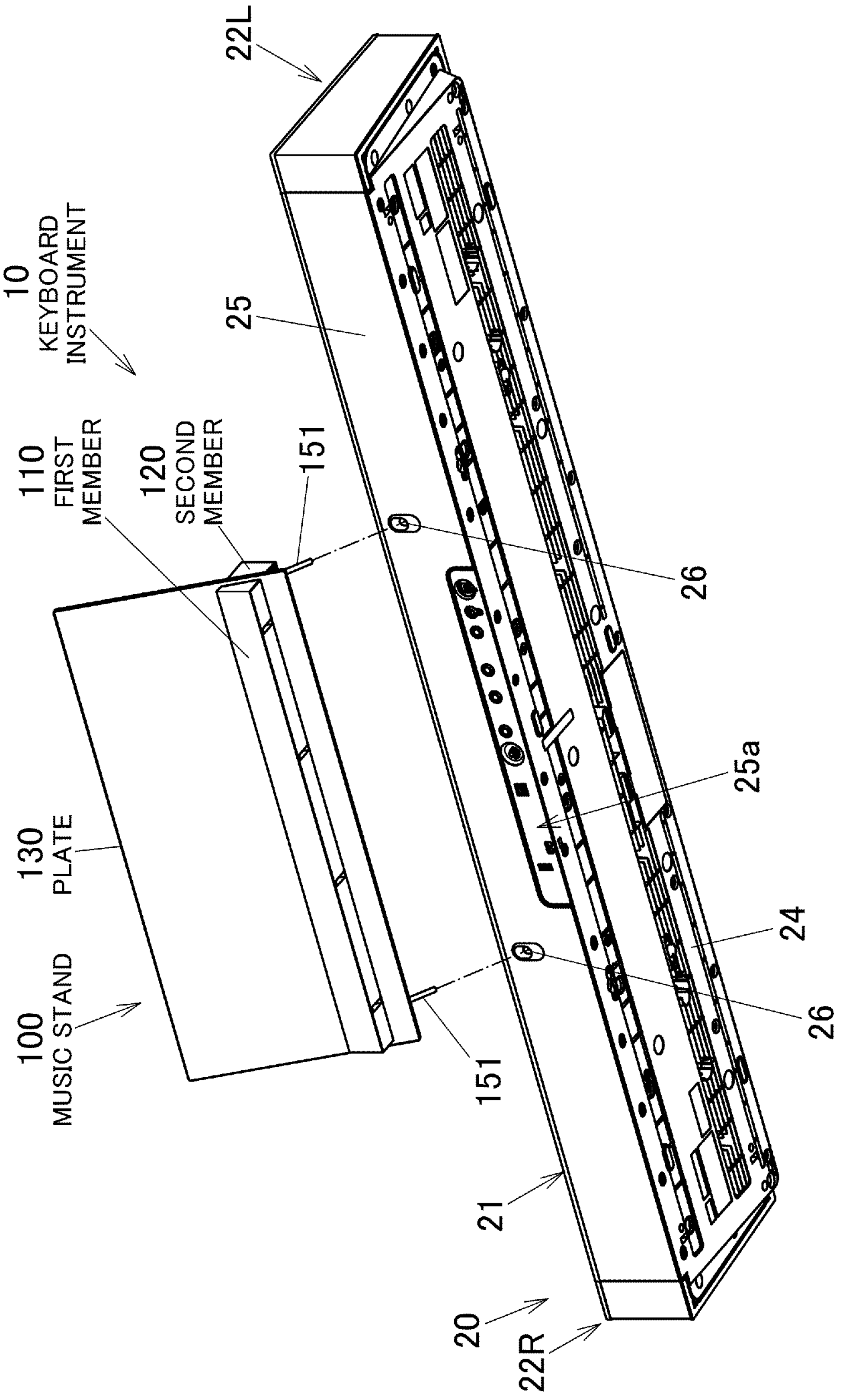
FIG. 2 is a perspective view of the keyboard instrument which is the musical instrument according to the embodiment of the present disclosure as viewed from a left lower back side thereof.
Figure 3:
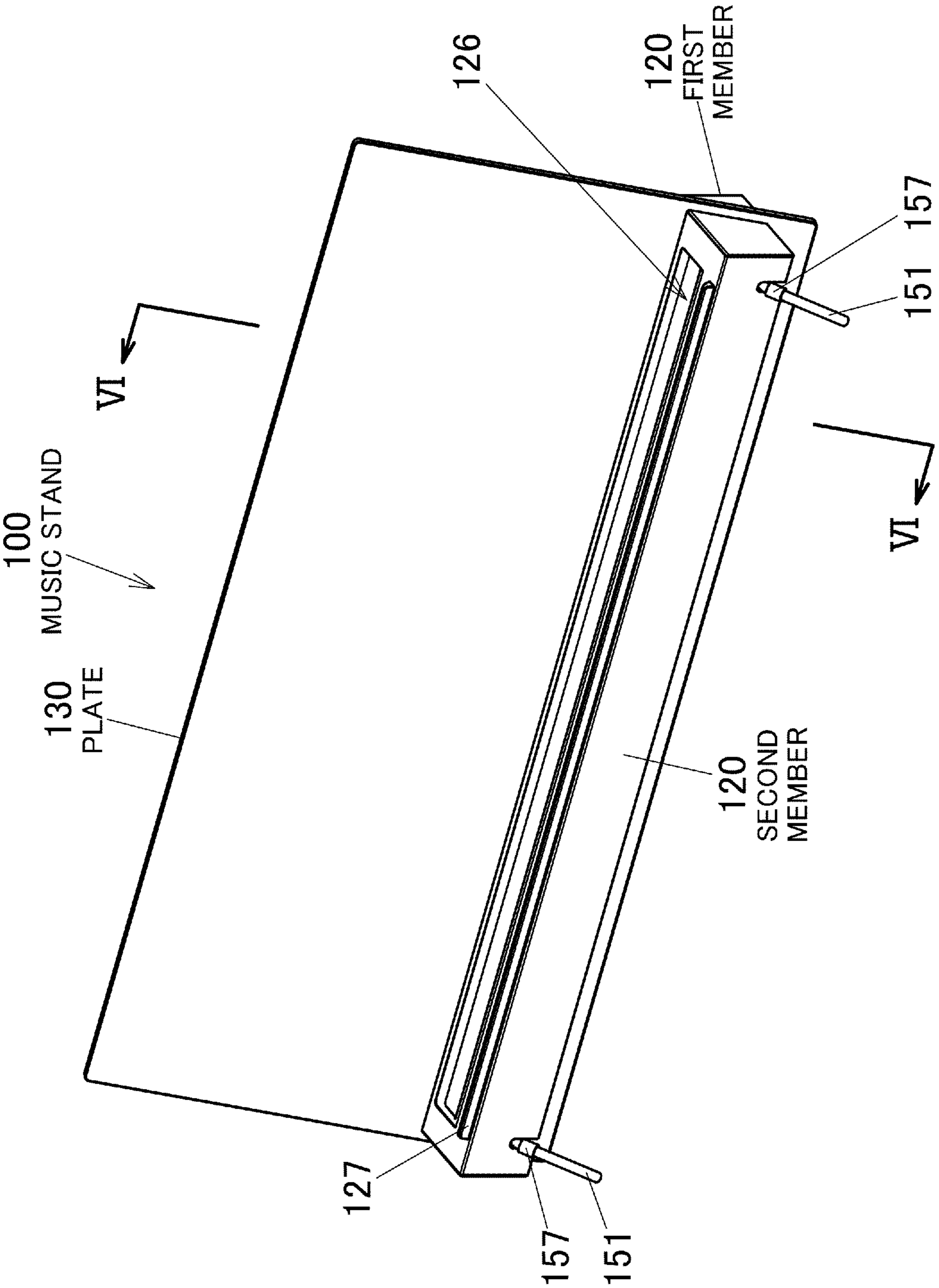
FIG. 3 is a perspective view of a music stand according to the embodiment of the present disclosure as viewed from a right upper front side thereof.

As shown in FIG. 2, the upper case 21 connects to a back case 25 which intersects substantially at right angles to the upper case 21. The back case 25 connects to the lower case 24. A terminal panel 25*a*, to which a power supply code and an external device such as a speaker or the like are connected, is provided substantially at a central lower portion of the back case 25. Music stand attachment portions 26 are provided individually on both left and right sides of the electronic panel 25*a* on an upper side Up thereof. Although they will be described later, the music stand attachment portions 26 are each provided into a hole shape which descends obliquely to the lower side Up while extending towards the front side F. The music stand 100 is attached to a main body of the keyboard instrument 10 with insertion rods 151 of attachment members 150 of the music stand 100 inserted into the corresponding attachment portions 26.

The music stand 100 has a plate 130, a first member 110 configured to be provided on a back side B of the plate 130, and a second member 120 configured to be provided on a front side F of the plate 130. As shown in FIGS. 1 to 4, at the time of placement, the plate 130 is inclined in such a manner that a lower side Lo of the plate 130 is positioned further towards a player's side (forwards) than an upper side Up of the plate 130. Then, the first member 110 and the second member 120 sandwich the inclined plate 130 therebetween. A lower end or edge of the plate 130 is provided in such a manner as to project further downwards towards the lower side Lo than lower surfaces of the first member 110 and the second member 120.

Figure 5:
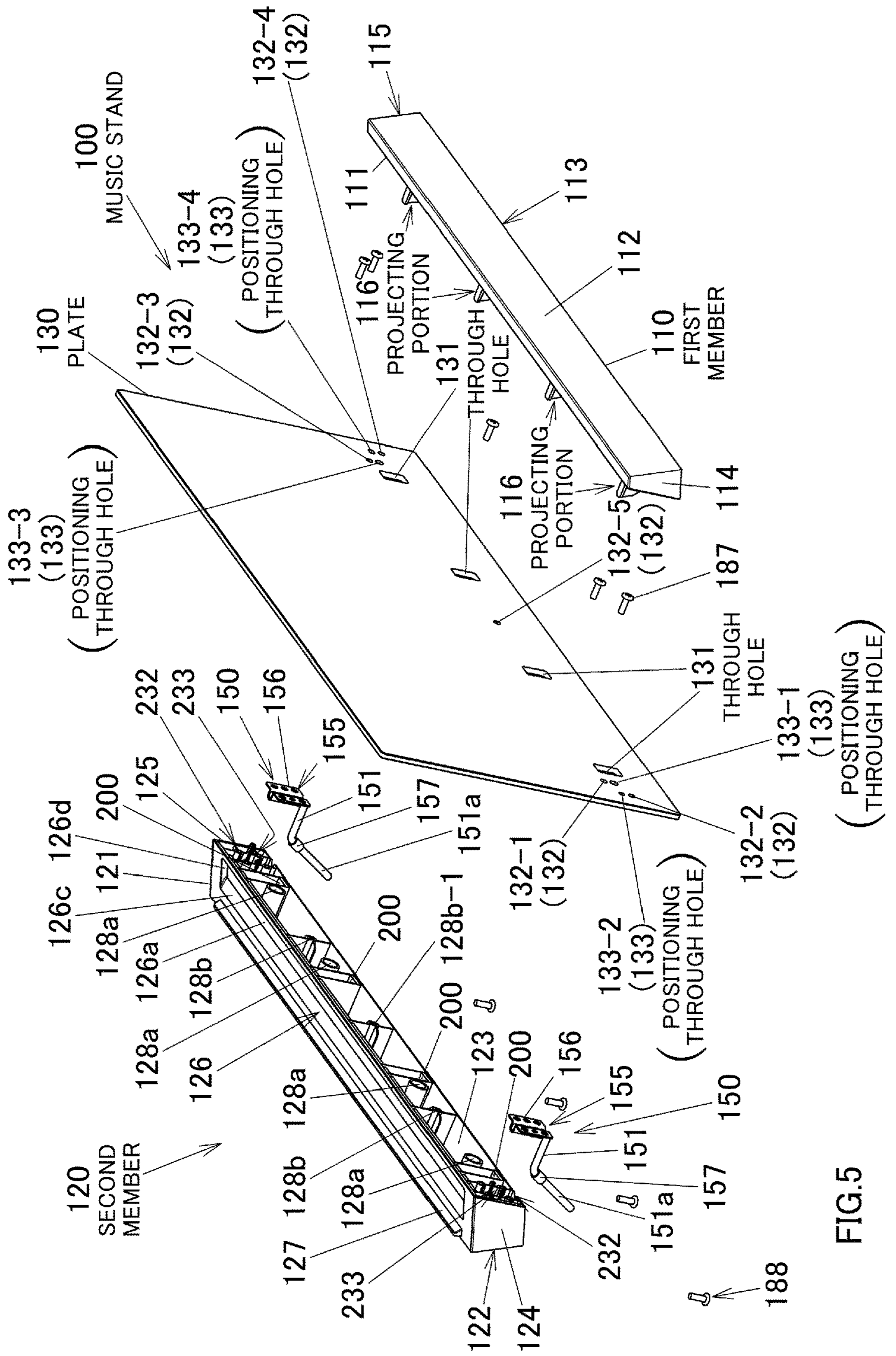
FIG. 5 is an exploded perspective view of the music stand according to the embodiment of the present disclosure.

As shown in FIG. 5, the plate 130 has a rectangular shape which is elongated in the left-right direction LR. Although the plate 130 is shown opaque in the drawings, the plate 130 can also be made transparent by being formed from a material such as acryl. Four through holes 131 are provided in the lower side Lo of the plate 130 in such a manner as to be disposed at equal intervals in the left-right direction LR. The through holes 131 are each made into a through hole having a rectangular shape which is elongated in the upper-lower direction UL. In addition, five screw holes 132 (screw holes 132-1 to 132-5), which each penetrate the plate 130 as a circular through hole, and four positioning through holes 133 (positioning through holes 133-1 to 133-4), which each penetrate the plate 130 as a circular or elliptic through hole, are provided in the lower side of the plate 130 in such a manner as to be aligned with the through holes 131 in the left-right direction LR.

The two screw holes 132-1, 132-2 and the two positioning through holes 133-1, 133-2 are provided on a right side R of the through hole 131 at a right end which is situated at a right side R and on the lower side Lo of the plate 130. The positioning through holes 133-1, 133-2 are circular through holes which are provided in such a manner as to be aligned side by side in the left-right direction LR. Of the positioning through holes 133-1, 133-2, the positioning through hole 133-1 is provided laterally inwards, and the positioning through hole 133-2, which is smaller in diameter than the positioning through hole 133-1, is provided laterally outwards.

The screw hole 132-1 is provided on an upper side Up of the positioning through hole 133-1. The screw hole 132-2 is provided on a lower side Lo of the positioning through hole 133-2. An inter-pitch distance between the positioning through hole 133-1 and the screw hole 132-1 in the upper-lower direction UL and an inter-pitch distance between the positioning through hole 133-2 and the screw hole 132-2 in the upper-lower direction UL are the same. An inter-pitch distance between the positioning through holes 133-1, 133-2 in the left-right direction LR and an inter-pitch distance between the screw holes 132-1, 132-2 in the left-right direction LR are the same.

The two screw holes 132-3, 132-4 and the two positioning through holes 133-3, 133-4 are provided on a left side L of the through hole 131 at a left end which is situated at a left side L and on the lower side Lo of the plate 130. The positioning through holes 133-3, 133-4 are through holes which are provided in such a manner as to be aligned side by side in the left-right direction LR. Of the positioning through holes 133-3, 133-4, the elliptic hole-shaped positioning through hole 133-4 is provided laterally outwards, and the circular positioning through hole 133-3 is provided laterally inwards.

The screw hole 132-3 is provided on an upper side Up of the positioning through hole 133-3. The screw hole 132-4 is provided on a lower side Lo of the positioning through hole 133-4. An inter-pitch distance between the positioning through hole 133-3 and the screw hole 132-3 in the upper-lower direction UL and an inter-pitch distance between the positioning through hole 133-4 and the screw hole 132-4 in the upper-lower direction UL are the same. An inter-pitch distance between the positioning through holes 133-3, 133-4 in the left-right direction LR and an inter-pitch distance between the screw holes 132-3, 132-4 in the left-right direction LR are the same.

The screw hole 132-5 is provided substantially in a center in the left-right direction LR on the lower side Lo of the plate 130. The screw hole 132-5 is provided in such a manner as to be aligned with the positioning through holes 133 in the left-right direction LR. Specifically speaking, the positioning through hole 133-2, the positioning through hole 133-1, the screw hole 132-5, the positioning through hole 133-3, and the positioning through hole 133-4 are provided in such a manner as to be aligned sequentially in that order in the left-right direction LR from the right side R.

The first member 110 is provided substantially into a box shape which is elongated in the left-right direction LR while being opened on a front side F thereof. The first member 110 has an upper plate 111, a back plate 112, a bottom plate 113, a right-hand side plate 114, and a left-hand side plate 115. The right-hand side plate 114 and the left-hand side plate 115 are each formed substantially into a rectangular trapezoidal shape in left and right side views. As a result, the first member 110 has substantially a rectangular trapezoidal shape in its side view.

Figure 6:
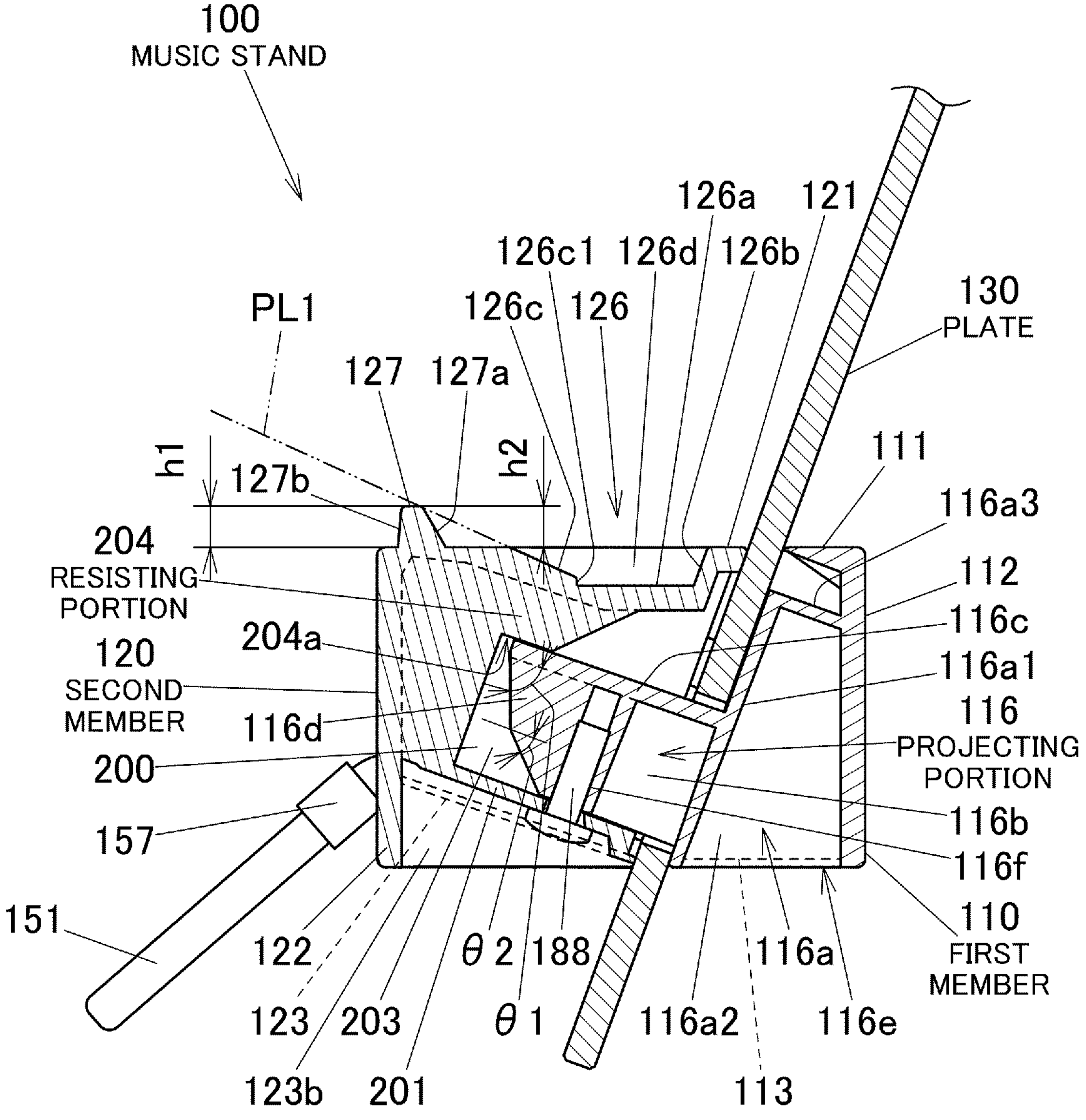
FIG. 6 is a sectional view of the music stand according to the embodiment of the present disclosure taken along a line VI-VI in FIG. 3.
Figure 7:
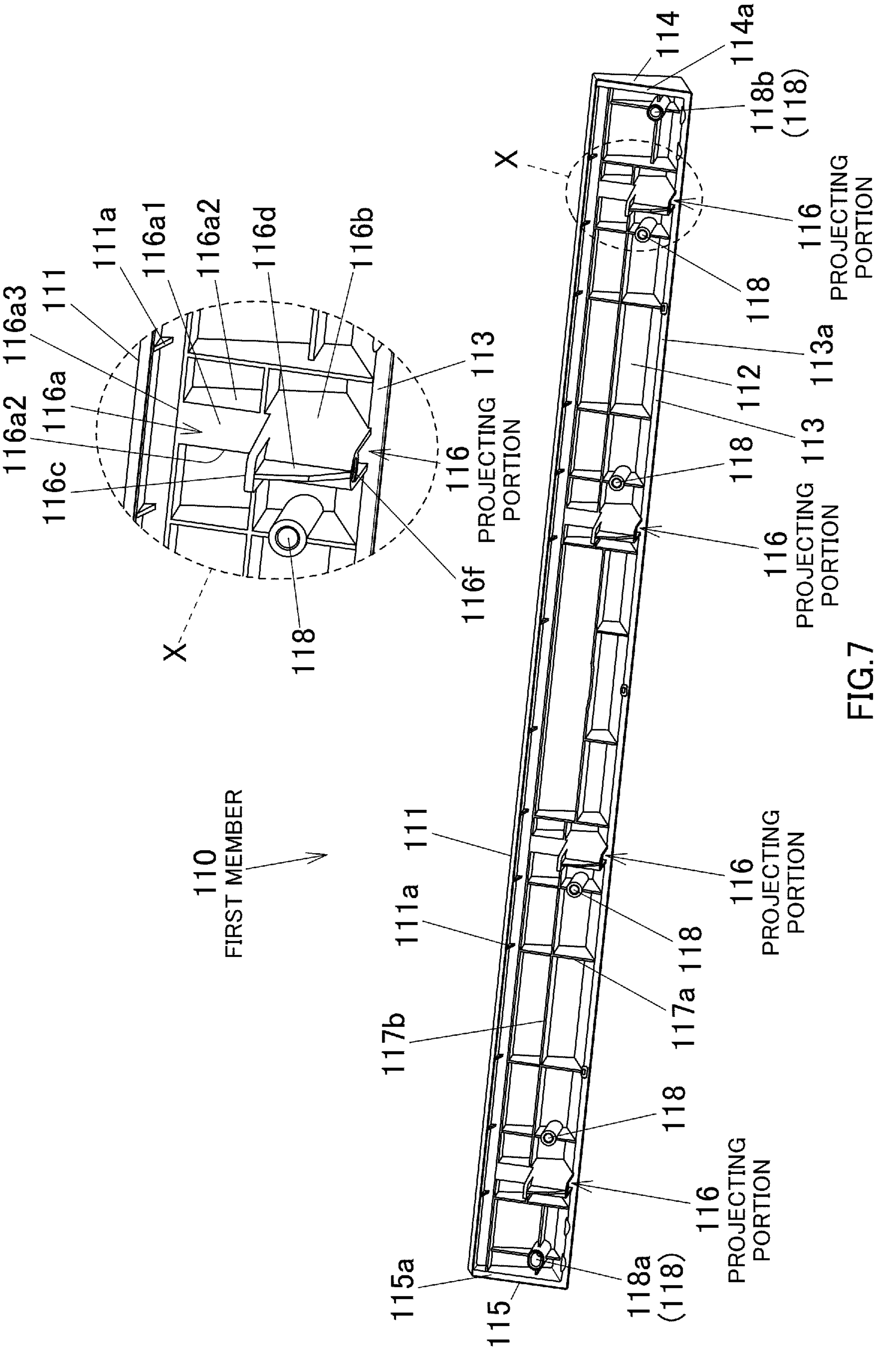
FIG. 7 is a perspective view of a first member of the music stand according to the embodiment of the present disclosure as viewed from a front thereof, with a partial enlarged view of a portion thereof.

Here, as shown in FIG. 7, a front edge surface 113*a* of the bottom plate 13 inclines in such a manner as to continue to an inclined edge surface 114*a* of the right-hand side plate 114 on a front side F thereof and an inclined edge surface 115*a* of the left-hand side plate 115 on a front side F thereof. In addition, as show in FIG. 6, when the upper plate 111 is viewed from a side or in its side view thereof, the upper plate 111 has substantially a right triangular shape in which a distal end is formed into an acute angle and an oblique side is provided on a lower side Lo thereof.

Figure 4:
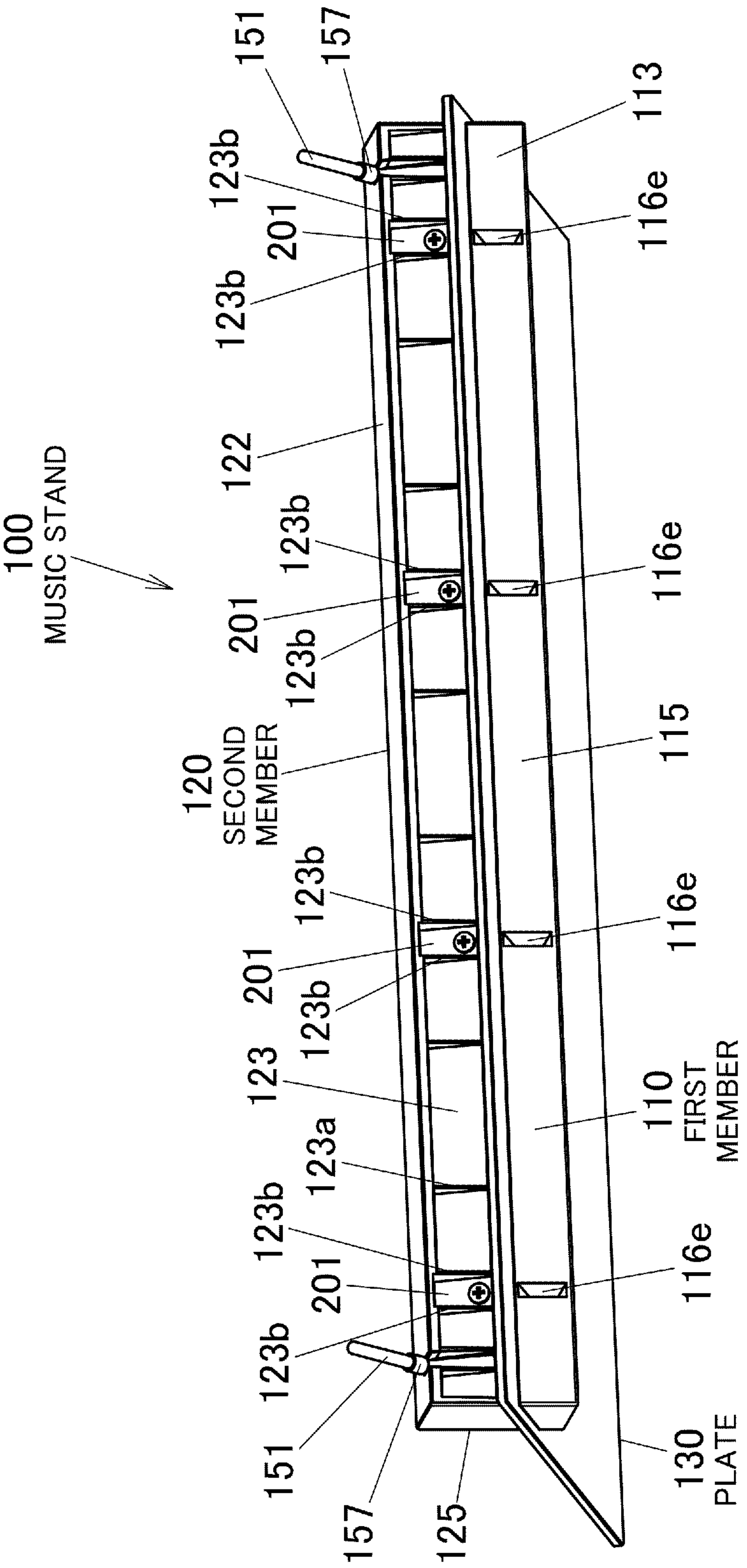
FIG. 4 is a perspective view of the music stand according to the embodiment of the present disclosure as viewed from a lower side thereof.

The first member 110 includes projecting portions 116 which project to the front side F. As shown in FIGS. 6 and 7, the projecting portion 116 is provided in such a manner as to incline upwards towards the upper side Up with respect to the bottom plate 113. The projecting portion 116 includes a substantially box-shaped base 116*a* which is caused to incline on a front side F thereof, a U-shaped projecting portion 116*b*, and an engagement plate 116*c*. The base 116*a* projects to the front side F from the back plate 12 and is provided substantially into the box of a substantially rectangular trapezoidal shape as viewed from a side thereof while being opened in a lower side Lo thereof so as to form an opening 116*e*. The opening 116*e* is shown in FIGS. 4 and 6. As shown in FIGS. 6 and 7, an inclined front plate 116*a*1 and left- and right-hand side plates 116*a*2 of the base 116*a* connect to the bottom plate 113. A top plate 116*a*3 is provided at upper ends of the inclined front plate 116*a*1 and the left- and right-hand side plates 116*a*2.

The projecting portion 116 includes the U-shaped projecting portion 116*b* which extends to the front from the left- and right-hand side plates 116*a*2 of the base 116*a*. The U-shaped projecting portion 116*b* is formed substantially into a U-shape as viewed from below. The U-shaped projecting portion 116*b* is opened in a lower side Lo thereof at a proximal end side, and an internally threaded portion 116*f* is provided at a distal end side of the U-shaped projecting portion 116*b*. A side surface of the U-shaped projecting portion 116*b* continues to side surfaces of the left- and right-hand side plates 116*a*2 of the base 116*a*.

The engagement plate 116*c* is provided on an upper surface of the U-shaped projecting portion 116*b* in such a manner as to project to the front into a flat plate shape from the front plate 116*a*1 of the base 116*a*. A projecting end of the engagement plate 116*c* projects further forwards than a curved distal end of the U-shaped projecting portion 116*b*. A vertical rib 116*d* is provided in such a manner as to extend from a lower surface of the engagement plate 116*c* to the distal end of the U-shaped projecting portion 116*b* so as to support the engagement plate 116*c*. The vertical rib 116*d* is provided in such a manner that a front edge of the vertical rib 116*d* is caused to incline, and further, inclination angles are made to differ between on a lower side Lo and an upper side Up of the vertical rib 116*d*. Specifically speaking, an angle Θ1 formed by the upper side Up of the vertical rib 116*d* and the engagement plate 116*c* is set larger than an angle θ2 formed by the lower side Lo and the engagement plate 116*c*. This facilitates an insertion of the projecting portion 116 into a recessed portion 200, which will be described later. That is, even though the projecting portion 116 is inserted into the recessed portion 200 with the plate 130 made to stand somewhat upright, the projecting portion 116 is guided smoothly into the recessed portion 200 by the front edge of the vertical rib 116*d* which inclines at the different angles, whereby the plate 130 can be attached while being caused to incline to the back at a set angle.

As shown in FIG. 7, plural vertical ribs 117*a* and plural horizontal ribs 117*b* are provided into a grid-like configuration for reinforcement in an interior of the first member 110. The vertical rib 117*a* is provided in such a manner as to extend between the back plate 112 and the bottom plate 113. The horizontal rib 117*b* is provided in such a manner as to connect the adjacent vertical ribs 117*a* together. The vertical rib 117*a* has substantially a rectangular trapezoidal shape in its side view.

Plural bosses 118 are provided on some of the vertical ribs 117*a* at predetermined intervals in the left-right direction LR. As with the projecting portion 116, the boss 118 is provided in such a manner as to incline upwards towards the upper side Up. In other words, the bosses 118 and the projecting portions 116 are provided so as to be substantially at right angles to the inclined edge surfaces 114*a*, 115*a* of the right-hand side plate 114 and the left-hand side plate 115 on the front side F thereof. A boss 118*a* at a left end is made into a boss having an elliptic hole shape which is elongated in the left-right direction LR, and the bosses 118 excluding the boss 118*a* at the left end are all formed substantially into a circular cylindrical shape. In addition, a boss 118*b* at a right end is made into a boss having a slightly larger inside diameter than those of all the other bosses 118. Further, plural vertical ribs 111*a* are provided on a lower surface of the upper plate 111 in such a manner as to extend between the upper plate 111 and the back plate 112.

As shown in FIG. 5, the second member 120 is formed substantially into a box shape which is elongated in the left-right direction LR and is opened on a back side B thereof. The second member 120 has an upper plate 121, a front plate 122, a bottom plate 123, a right-hand side plate 124, and a left-hand side plate 125. The right-hand side plate 124 and the left-hand side plate 125 are each formed substantially into an inverted rectangular trapezoidal shape having an oblique side on a back side B thereof. As a result, the second member 120 has substantially an inverted rectangular trapezoidal shape in its side view which includes the oblique side which faces the oblique side of the substantially rectangular trapezoidal shape of the first member 110 which results in its side view. Here, when the first member 110 and the second member 120 are assembled with the plate 130 being sandwiched therebetween, a substantially rectangular shape which is elongated in the front-back direction FB is formed by the first member 110 and the second member 120 when seen from a side. In this state, the bottom plate 123 inclines downwards towards the back side B (refer to FIG. 6). The bottom plate 123, the engagement plate 116*c* of the projecting portion 116, and a lower edge of the U-shaped projecting portion 116*b* of the first member 110 are substantially parallel to one another. As show in FIG. 4, plural reinforcement vertical ribs 123*a* are provided on a lower surface of the bottom plate 123 so as to support the front plate 122 and the bottom plate 123.

Returning to FIG. 5, a recessed groove 126, which is elongated in the left-right direction LR, is provided on the upper plate 121 of the second member 120. The recessed groove 126 provided on a top surface of the second member 120 is provided in such a manner as to correspond to the front surface of the plate 130. A lower surface of the upper plate 121 projects at a portion corresponding to the recessed groove 126 (refer to FIG. 8). A long projecting portion 127

(an elongated projecting portion) is provided on a front side F (a player's side) of the recessed groove 126, and this long projecting portion 127 is parallel to the recessed groove 126 and has a length in the left-right direction which is substantially the same as a length in the left-right direction of the recessed groove 126.

As shown in FIG. 6, the recessed groove 126 has a bottom surface 126*a*, a back wall surface 126*b* on the back side B, and a front wall surface 126*c* (a front wall surface portion) on the front side F which faces the back wall surface 126*b*. The front wall surface 126*c* is connected to the bottom surface 126*a* via a riser portion 126*c*1. The back wall surface 126*b* inclines towards the back, and the back wall surface 126*b* and the front wall surface 126*c* incline in such a manner as to expand relative to or move away from each other in side view or in section. An end wall surface 126*d* is provided at each of left and right ends of the recessed groove 126.

The long projecting portion 127 is provided on a front side F of the recessed groove 126 in such a manner as to be positioned a predetermined distance away from an upper end of the front wall surface 126*c* of the recessed groove 126. The long projecting portion 127 is formed substantially into a trapezoidal shape in side view or in section, whereby the rigidity of the long projecting portion 127 is enhanced. An angle at which a back inclined surface 127*a*, which is an inclined surface on a back side B of the long projecting portion 127, inclines is made smaller (a degree of inclination is moderate, compared with) than an angle at which a front inclined surface 127*b*, which is an inclined surface on a front side F of the long projecting portion 127, inclines.

Here, let's assume that a surface resulting from extending the front wall surface 126*c* of the recessed groove 126 to the front side F is an imaginary plane PL1, the long projecting portion 127 is provided between the imaginary plane PL1 and an upper surface of the upper plate 121. In other words, a height h1 from the upper surface of the upper plate 121 to a projecting end of the long projecting portion 127 is made equal to or smaller than a height h2 defined from the upper surface of the upper plate 121 to the imaginary plane PL1 which corresponds to an upper surface of the long projecting portion 127. In the present embodiment, the height h1 and the height h2 are made equal to each other (h1=h2).

Figure 8:
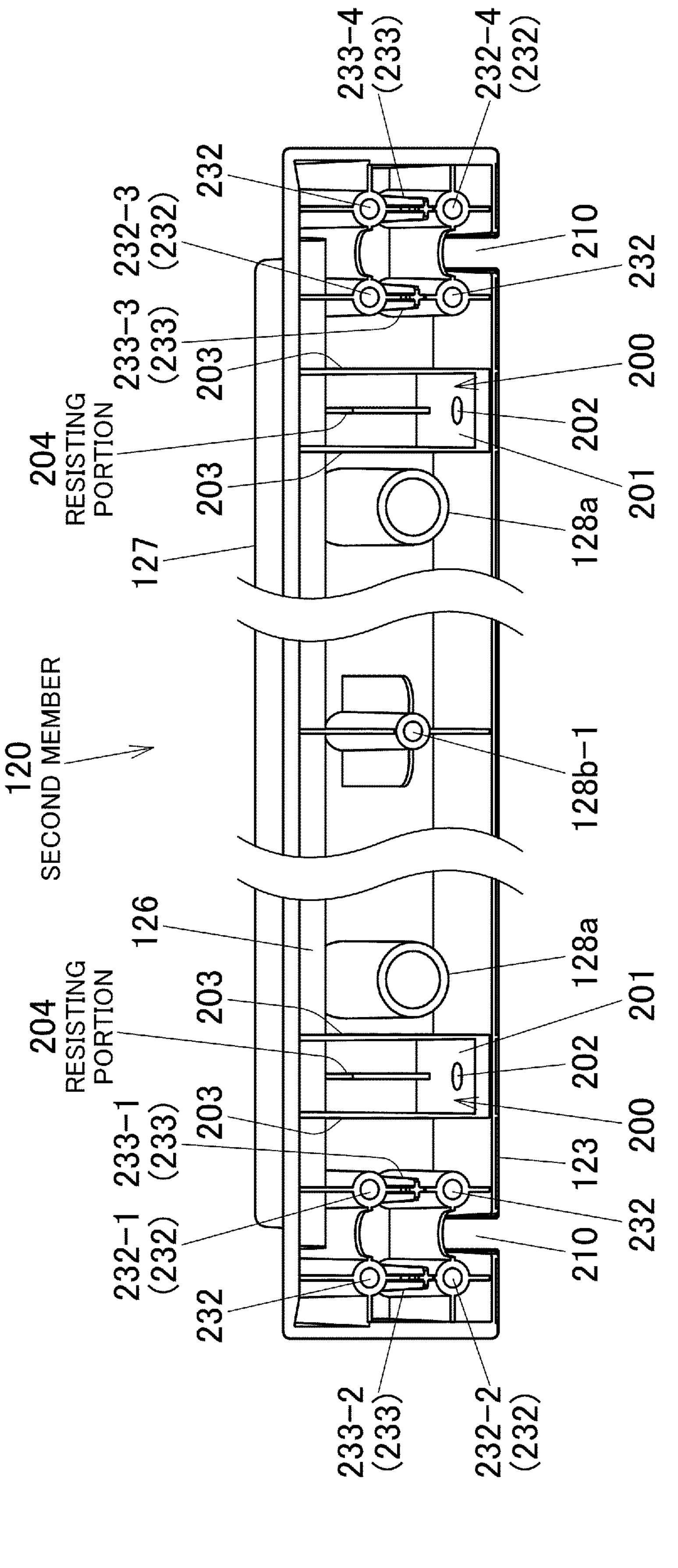
FIG. 8 is a view of a second member of the music stand according to the embodiment of the present disclosure as viewed from a back thereof.

As partially shown in FIGS. 5 and 8, too, four large-diameter bosses 128*a*, which are aligned in the left-right direction LR, and three small-diameter bosses 128*b*, which are positioned individually between the four large-diameter bosses 128*a* and which each have a smaller diameter than that of the large-diameter bosses 128*a*, are provided in an interior of the second member 120. The large-diameter bosses 128*a* and the small-diameter bosses 128*b* are erected parallel to the bottom plate 123 from a rear surface of the front plate 122. Ribs are provided on the small-diameter boss 128*b* in the upper-lower direction UL and the left-right direction LR. The ribs in the left-right direction LR are connected to the front plate 122, and the ribs in the upper-lower direction UL are connected to the upper plate 121, the front plate 122 and the bottom plate 123. An internally threaded portion is provided in a small-diameter boss 128*b*-1 which is disposed substantially at a center of the second member 120 in the left-right direction LR. A screw member 187 is screwed into the small-diameter boss 128*b*-1 by way of the screw hole 132-5 in the plate 130.

Four recessed portions 200 are provided in the interior of the second member 120. The recessed 200, the projecting portions 116 of the first member 110, and the through holes 131 in the plate 130 are disposed in such a manner as to correspond to one another, and the projecting portions 116 are passed through and inserted into the corresponding through holes 131 and recessed portions 200, respectively. As shown in FIG. 8, in the recessed portion 200, a bottom plate portion 201 is provided parallel to the bottom plate 123 and on an upper side of the bottom plate 123. A screw hole 202 is provided in the bottom plate portion 201.

A vertical rib 203 is provided at each of left and right ends of the bottom plate portion 201 of the recessed portion 200. The vertical rib 203 connects to the upper plate 121, the front plate 122, and the bottom plate 123, and two vertical ribs 203 are disposed in such a manner as to sandwich the bottom plate 201 therebetween. A vertical rib 123*b* having substantially a triangular shape in its side view is provided on a lower surface of the bottom plate portion 201 (the bottom plate 123) in such a manner as to correspond to and continue to each vertical rib 203.

As shown in FIG. 8, a plate-shaped resisting portion 204 is provided at a center between the left and right vertical ribs 203 in such a manner as to be parallel to the vertical ribs 203. As shown in FIG. 6, a lower edge 204*a* of the resisting portion 204 is provided in such a manner as to be brought into abutment with an upper surface of the engagement plate 116*c* of the projecting portion 116 in such a state that the second member 120, the first member 110, and the plate 130 are assembled together. The resisting portion 204 resists an own weight of the first member 110 which is transmitted from the projecting portion 116 as a result of the lower edge 204*a* being brought into abutment with the engagement plate 116*c*.

Four bosses 232 are provided at a right end portion of the second member 120. The four bosses 232 are arranged in such a manner that respective apex positions form a regular quadrangular shape. The four bosses 232 are connected to each other, and to the upper plate 111, the front plate 122, the right-hand side plate 124, and the bottom plate 123 by vertical ribs and horizontal ribs.

A substantially cruciform positioning projection 233 is provided on each of the two vertical ribs disposed to connect the adjacent bosses 232 in the upper-lower direction UL. The inward (left side L) positioning projection 233 is referred to as a first positioning projection 233-1, and the outwards (right side R) positioning projection 233 is referred to as a second positioning projection 233-2. The second positioning projection 233-2 is longer than the first positioning projection 233-1 and projects from back edges of the right-hand side plate 124 and the left-hand side plate 125. The first positioning projection 233-1 projects slightly from the back edges of the right-hand side plate 124 and the left-hand side plate 125.

Similarly, four bosses 232 and two positioning projections 233 are also provided at a left end portion of the second member 120. In the four bosses 232, an internally threaded portion is provided in each of the boss 232-3 disposed on the right side R on the upper side Up and the boss 232-4 disposed on the left side L on the lower side Lo. In addition, of the two positioning projections 233, the inward (right side R) positioning projection is referred to as a first positioning projection 233-3, and the outward (left side L) positioning projection is referred to as a second positioning projection 233-4. The second positioning projection 233-4 is longer than the first positioning projection 233-3 and projects from the back edges of the right-hand side plate 124 and the left-hand side plate 125 in its side view. The first positioning projection 233-3 projects slightly from the back edges of the right-hand side plate 124 and the left-hand side plate 125 in its side view.

Here, the four positioning projections 233 (the first positioning projections 233-1, 233-3, the second positioning projections 233-2, 233-4) each have substantially the cruciform shape, and diameters of respective circumscribed circles of the cruciform shapes are made substantially the same. The plural positioning projections 233 and the plural bosses 232 are erected substantially parallel to the bottom plate 123. In addition, a cut-out 210 corresponding to the insertion rod 151 of the attachment member 150, which will be described later, is provided in the bottom plate 123 at each of the left and right end portions of the second member 120.

As shown in FIG. 5, in total, the two attachment members 150 are provided at the left end portion and the right end portion of the second member 120. The attachment member 150 includes a fixing member 156 made of a sheet metal material. The fixing member 156 includes a total of six holes 155 which are arranged in three rows and two columns (referred to as holes 155*a* to 155*f* sequentially from a top right one, refer to FIGS. 9 and 10) and a concave portion 156*a* (refer to FIGS. 9 and 10) in which a proximal portion of the insertion rod 151 is disposed. The insertion rod 151 of the attachment member 150 is formed by working a metallic rod member so as to be bent substantially into a crank shape. The fixing member 156 and the insertion rod 151 are both formed of metal. A slip prevention member 157, which is formed of a short pipe-shaped silicone member, is provided in the vicinity of a bent proximal portion of a straight-line distal end portion 151*a* of the insertion rod 151.

Hereinafter, a corresponding relationship will be described which is defined among the second member 120, the plate 130, and the attachment member 150 when the second member 120, the plate 130, and the attachment member 150 are attached together with screw members 187 (refer to FIG. 5, too). Specifically speaking, a corresponding relationship will be described which is defined among the holes 155 of the fixing member 156 of the attachment member 150 which is disposed between the second member 120 and the plate 130, the screw holes 132 and the positioning through holes 133 in the plate 130, and the positioning projections 233 and the bosses 232 of the second member 120.

Figure 9:
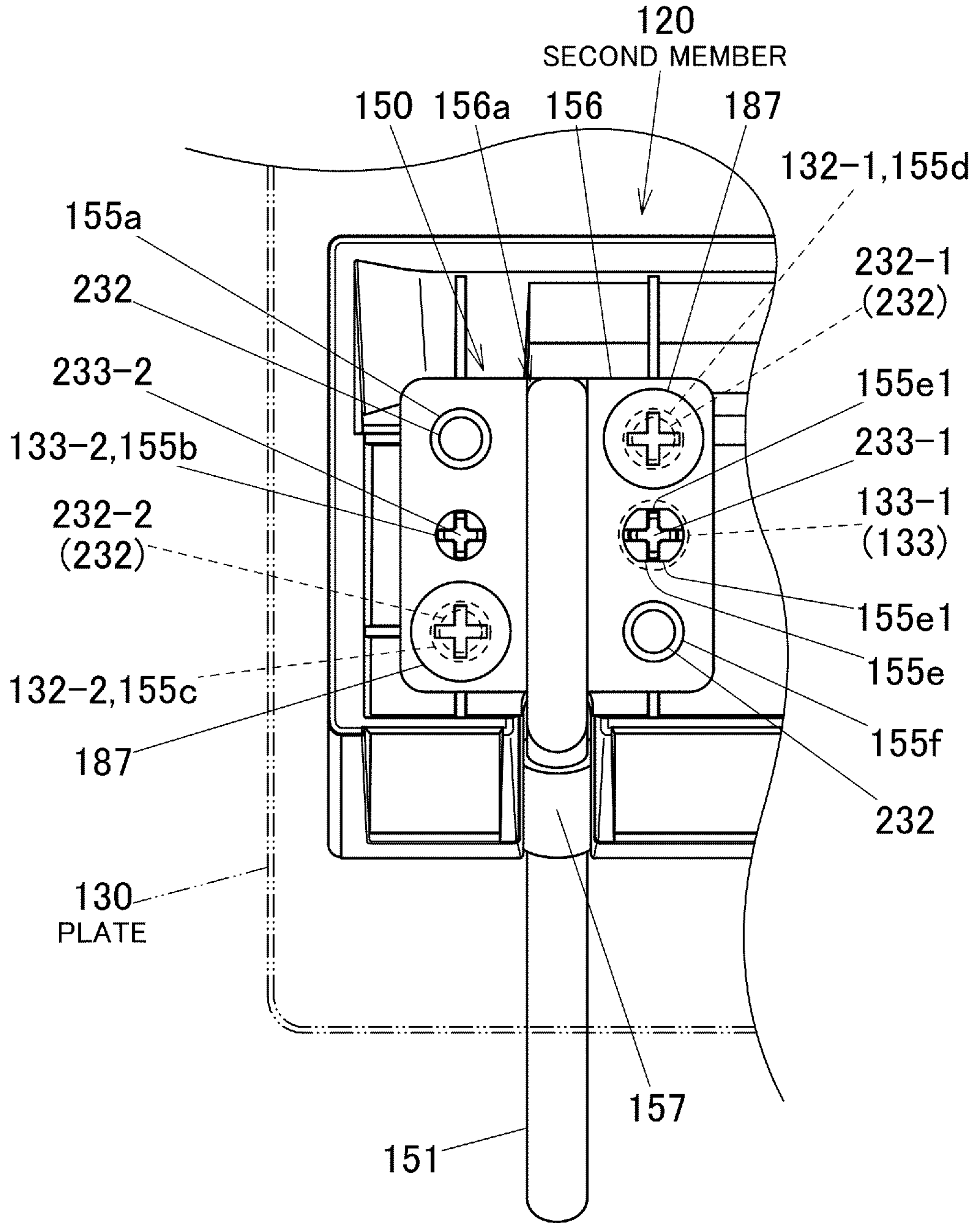
FIG. 9 is an enlarged view of a circumference of a right end of the second member of the music stand according to the embodiment of the present disclosure, with the plate indicated by chain double-dashed lines and the first member omitted from illustration.

As shown in FIG. 9, a screw member 187 is screwed into the internally threaded portion in the boss 232-2 which is situated on the right side R on the lower side Lo after passing through the screw hole 32-2 in the plate 130 and the hole 155*c* of the attachment member 150. A screw member 187 is screwed into the boss 232-1 which is situated on the left side L on the upper side Up after passing through the screw hole 132-1 in the plate 130 and the hole 155*d* of the attachment member 150. The holes 155*c*, 155*d* of the attachment member 150 are each made into a screw hole and are provided sufficiently large with respect to a shank portion of the screw member 187.

The second positioning projection 233-2 passes through the hole 155*b* of the attachment member 150 and the positioning through hole 133-2 in the plate 130. The hole 155*b* and the positioning through hole 133-2 are each made into a through hole of a diameter which is substantially the same as an outside diameter of the second positioning projection 233-2 to such an extent that the substantially cruciform second positioning projection 233-2 can be inserted thereinto. As a result, an outer circumference of the second positioning projection 233-2 is in sliding contact with inner circumferential surfaces of the hole 155*b* and the positioning through hole 133-2.

In addition, the second positioning projection 233-2 is inserted into a positioning hole which is a boss hole in the boss 118*b* (refer to FIG. 7) at the right end portion of the first member 110 so as to position the first member 110 relative to the second member 120 when the first member 110 and the second member 120 are assembled together.

Although the first positioning projection 233-1 is passed through the hole 155*e* of the attachment member 150, the first positioning projection 233-1 is inserted into the positioning through hole 133-1 in the plate 130 to such an extent corresponding to a half of a thickness of the plate 130. A chamfered straight-line portion 155*e*1 is provided individually at an upper part and a lower part of the hole 155*e*. An upper surface and a lower surface of the first positioning projection 133-1 lie close to or are in sliding contact with inner edges of the chamfered straight-line portions 155*e*1 of the hole 155*e*, while gaps are provided between the first positioning projection 233-1 and the hole 155*e* in the left-right direction LR. In addition, the positioning through hole 133-1 in the plate 130 is made larger in diameter than the first positioning projection 233-1. The positioning through hole 133-1 is made larger in diameter than the positioning through hole 133-2. As a result, the first positioning projection 233-1 fits loosely in the positioning through hole 133-1.

Figure 10:
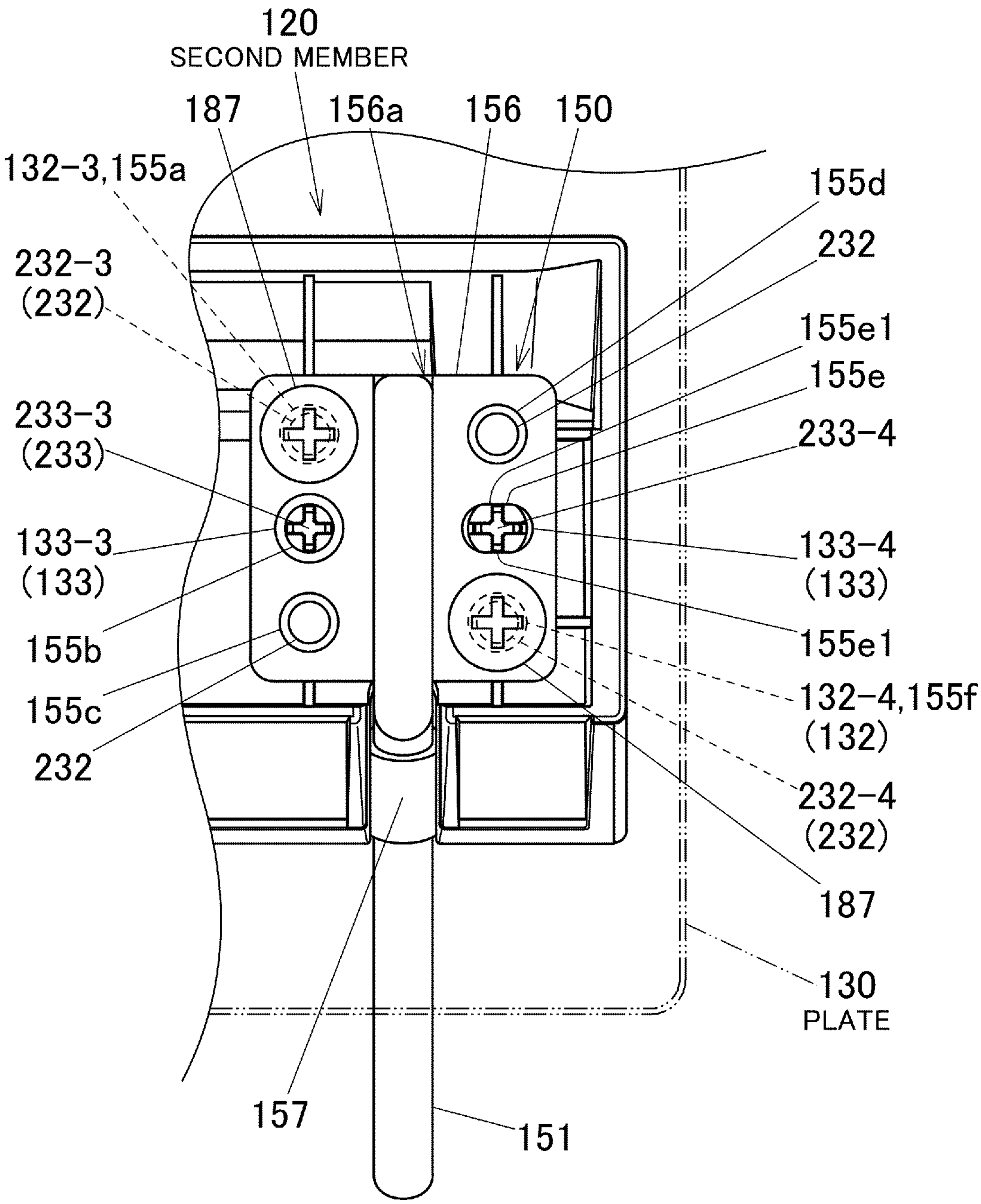
FIG. 10 is an enlarged view of a circumference of a left end of the second member of the music stand according to the embodiment of the present disclosure, with the plate indicated by chain double-dashed lines and the first member omitted from illustration.

As shown in FIG. 10, a screw member 187 is screwed into the boss 232-3 which is situated on the right side R on the upper side Up after passing through the screw hole 132-3 in the plate 130 and the hole 155*a* of the attachment member 150. A screw member 187 is screwed into the boss 232-4 which is situated on the left side L on the lower side Lo after passing through the screw hole 132-4 in the plate 130 and the hole 155*f* of the attachment member 150. The holes 155*a*, 155*f* of the attachment member 150 are each made into a screw hole and are provided sufficiently large relative to a shank portion of the screw member 187.

Although the first positioning projection 233-3 is passed through the hole 155*b* of the attachment member 150, the first positioning projection 233-3 is inserted into the positioning through hole 133-3 in the plate 130 to such an extent corresponding to a half of the thickness of the plate 130. An outer circumference of the substantially cruciform first positioning projection 233-3 is in sliding contact with an inner circumferential surface of the hole 155*b* of the attachment member 150. On the other hand, the positioning through hole 133-3 in the plate 130 is provided larger in diameter than the hole 155*b*. As a result, the first positioning projection 233-3 fits loosely in the positioning through hole 133-3.

The second positioning projection 233-4 pass through the hole 155*e* of the attachment member 150 and the positioning through hole 133-4 in the plate 130. An upper surface and a lower surface of the second positioning projection 233-4 lie close to or are in sliding contact with inner edges of chamfered straight-line portions 155*e*1 of the hole 155*e*, while gaps are provided between the second positioning projection 233-4 and the hole 155*e* in the left-right direction LR. In addition, the positioning through hole 133-4 in the plate 130 is made into an elliptic hole which is elongated in the left-right direction LR. A dimension of the positioning through hole 133-4 in the upper-lower direction UL is made slightly smaller than a distance defined between the straight-line portions 155*e*1 of the hole 155*e* to such an extent that the upper surface and the lower surface of the second positioning projection 233-4 are almost in sliding contact with inner edges of the straight-line portions 155*e*1.

In addition, the second positioning projection 233-4 is inserted into the positioning through hole which is a boss hole in the boss 118*a* (refer to FIG. 7) at the left end portion of the first member 110 so as to position the first member 110 relative to the second member 120 when the first member 110 and the second member 120 are assembled together. The hole in the boss 118*a* is formed into an elliptic hole, and the hole in the boss 118*b* is formed into a circular hole, whereby production dimensional errors of the first member 110 and the second member 120 are absorbed by the boss 118*a*.

A second connecting portion for connecting the plate 130 and the second member 120 includes the screw members 187 and the bosses 232-1, 232-2, 232-3, 232-4 including the internally threaded portions into which the screw members 187 are screwed. When the plate 130 and the attachment members 150 (the fixing members 156) are both fixedly screwed together to the second member 120 with the screw members 187, the proximal portions of the insertion rods 151 which are disposed in the concave portions 156*a* of the fixing members 156 are brought into abutment with the front surface of the plate 130 to thereby be pressed on, whereby the proximal portions of the insertion rods 151 are fixed between the plate 130 and the fixing members 156. In this way, the insertion rods 151 are attached to the second member 120.

That is, the attachment member 150 is positioned relative to the second member 120 by the right central hole 155*b* and the positioning projection 233 and is positioned relative to the second member 120 by the left central hole 155*e* and the positioning projection 233 while absorbing the production errors of the members involved.

On the other hand, the plate 130 is positioned relative to the second member 120 in the left-right direction LR by the right end positioning through hole 133-2 and the second positioning projection 233-2 and is positioned relative to the second member 120 in the upper-lower direction UL by the left end positioning through hole 133-4 and the second positioning projection 233-4. Then, in the case that the plate 130 is made of a material of high moisture absorption characteristics (for example, an acrylic material or the like), the plate 130 is positioned relative to the second member 120 while absorbing even a dimension change due to an application environment by fitment of the positioning through hole 133-4, which is formed into the elliptic hole, and the second positioning projection 233-4. That is, even though the plate 130 expands or contacts in the left-right direction LR, the damage to the positioning projection 233 or the plate 130 due to such expansion or contraction is mitigated by the elliptic positioning through hole 133-4.

The front surface of the plate 130 is brought into abutment with back ends or edges of the upper plate 121, the right-hand side plate 124, the left-hand side plate 125, and the bottom plate 123 of the second member 120. Then, projecting ends of the four large-diameter bosses 128*a* and the small-diameter bosses 128*b* of the second member 120 lie close to or are in abutment with the front surface of the plate 130. The large-diameter bosses 128*a* and the small-diameter bosses 128*b* can support the plate 130 when a load is exerted on the plate 130 towards the back side B.

On the other hand, the four projecting portions 116 of the first member 110 are inserted into the corresponding recessed portions 200 of the second member 120 by way of the four corresponding through holes 131 in the plate 130. Then, screw members 188 are screwed individually into the internally threaded portions 161*f* of the projecting portions 116 from lower sides Lo of the recessed portions 200 via the screw holes 202 in the recessed portions 200, whereby the first member 110 is attached to the second member 120. A first connecting portion for connecting the first member 110 and the second member 120 together includes the screw members 188 and the internally threaded portions 116*f*. In addition, the back surface of the plate 130 is in surface abutment with the front plates 116*a*1 of the bases 116*a* of the projecting portion 116 of the first member 110.

When using the music stand 100, sheet music (a sheet or sheets of musical notation) is leaned against the plate 130 with a lower end thereof rested on the bottom surface 126*a* of the recessed groove 126. Then, although a load is applied to the plate 130 in an attempt to cause the plate 130 to incline further to the back, the first member 110 is supported relative to the second member 120 as a result of abutment of the engagement plates 116*c* of the projecting portions 116 of the first member 110 with the lower edges 204*a* of the resisting portions 204 of the second member 120, whereby the plate 130 is also supported accordingly. In particular, even in the case that the music stand 100 is used with thick sheet music (a thick set of sheets of musical notation) or a tablet-type personal computer (PC) displaying thereon sheet music rested in the recessed groove 126, the plate 130 is supported in an ensured fashion by the projecting portions 116 and the resisting portions 204.

Here, a configuration can be adopted in which a minute gap is provided individually between the resisting portions 204 and the projecting portions 116 in such a state that no sheet music is rested on the music stand 100, while both the resisting portions 204 and the projecting portions 116 are brought into abutment with each other when sheet music or the like is rested on the music stand 100.

The first member 110, which has the projecting portions 116 configured to be passed through the corresponding through holes 131 in the plate 130, can be disposed on one side of the front surface or the back surface of the plate 130, and the second member 120, which has the recessed portions 200 provided in such a manner as to correspond in place to the projecting portions 116, can be disposed on another side of the front surface or the back surface of the plate 130.

For example, adopting an opposite arrangement configuration to the configuration described above in the present embodiment, the first member 110 can be disposed on the front surface side (the front side F) of the plate 130, and the second member 120 can be disposed on the back surface side (the back side B) of the plate 130. Then, a structure results in which the projecting portions 116 disposed on the front surface side of the plate 130 are inserted in the corresponding recessed portions 200 disposed on the back surface side of the plate 130. In this structure, the plate 130 is supported only by the first connecting portion (that is, the connection by the screw members 188 and the projecting portions 116), and the resisting portions 204 cannot be disposed.

As a result, the first member 110 and the second member 120 can be attached to the plate 130 more strongly with the arrangement configuration according to the present embodiment in which the second member 120 is disposed on the front surface side of the plate 130, and the first member 110 is disposed on the back surface side of the plate 130 than with the exemplified arrangement configuration in which the first member 110 is disposed on the front surface side of the plate 130, and the second member 120 is disposed on the back surface side of the plate 130. Further, in the present embodiment, the screw member 188 can be disposed in such a manner as to correspond to the bottom plate portion 201, whereby the screw member 188 can be concealed by the second member 120, thereby making it possible to provide the music stand 100 of a good external appearance.

Then, since the riser portion 126*c*1 is provided in the recessed groove 126 at the connecting portion between the front wall surface 126*c* and the bottom surface 126*a*, the movement of the lower end of the sheet of musical notation, the tablet-type PC, or the like is restricted, whereby the sheet of musical notation, the tablet-type PC, or the like is made difficult to slip off the recessed groove 126. Then, even in the event that the sheet of musical notation or the tablet-type PC slides forwards beyond the riser portion 126*c*1, the forward sliding movement thereof is restricted by the long projecting portion 127.

In addition, in the case that a book of sheets of musical notation is used, the sheets need to be turned from time to time. Even though this occurs, a lower end of the sheet of musical notation which is to be so turned is turned along the imaginary plane PL1 (refer to FIG. 6), and hence, there is no such situation that the long projecting portion 127 which is provided at a height equal to or smaller than the imaginary plane PL1 interferes with the sheet of musical notation so turned.

Figure 11:
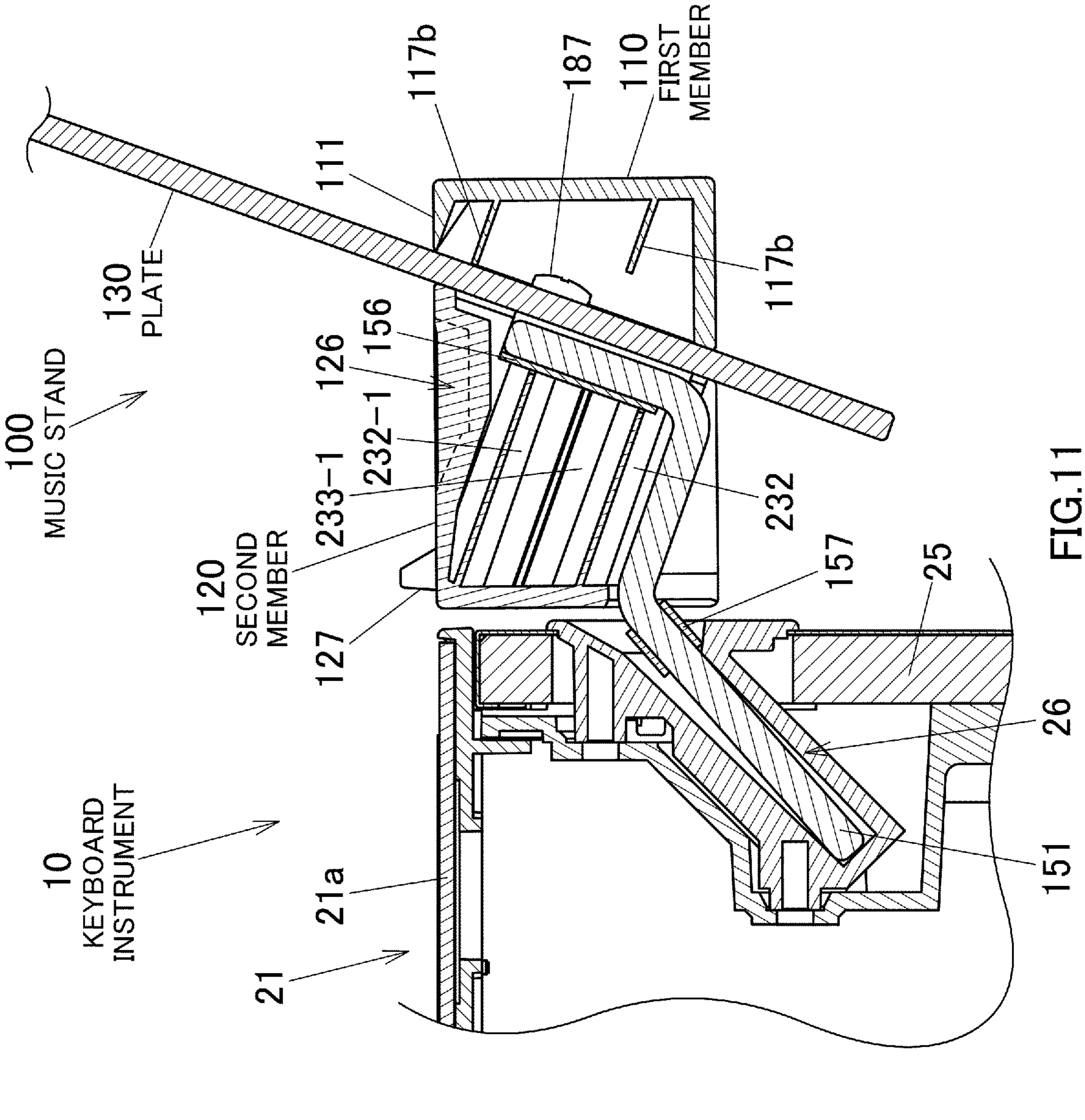
FIG. 11 is a sectional view of the keyboard instrument according to the embodiment of the present disclosure taken along a line XI-XI in FIG. 1 with a part of an internal structure of a keyboard instrument main body omitted from illustration.

As shown in FIG. 11, the music stand 100 is attached to the keyboard instrument 10 by inserting the insertion rods 151 individually into the music stand attachment portions 26 on the main body of the keyboard instrument 10. The music stand attachment portions 26 are each formed into the bottomed circular cylindrical shape and are provided in such a manner as to incline downwards towards the lower side Lo as they extend towards the front side F. In this state, the upper plate 121 of the second member 120 (the upper plate 111 of the first member 110) is made substantially horizontal and is disposed in such a manner as to substantially continue to the upper case 21.

Figure 12:
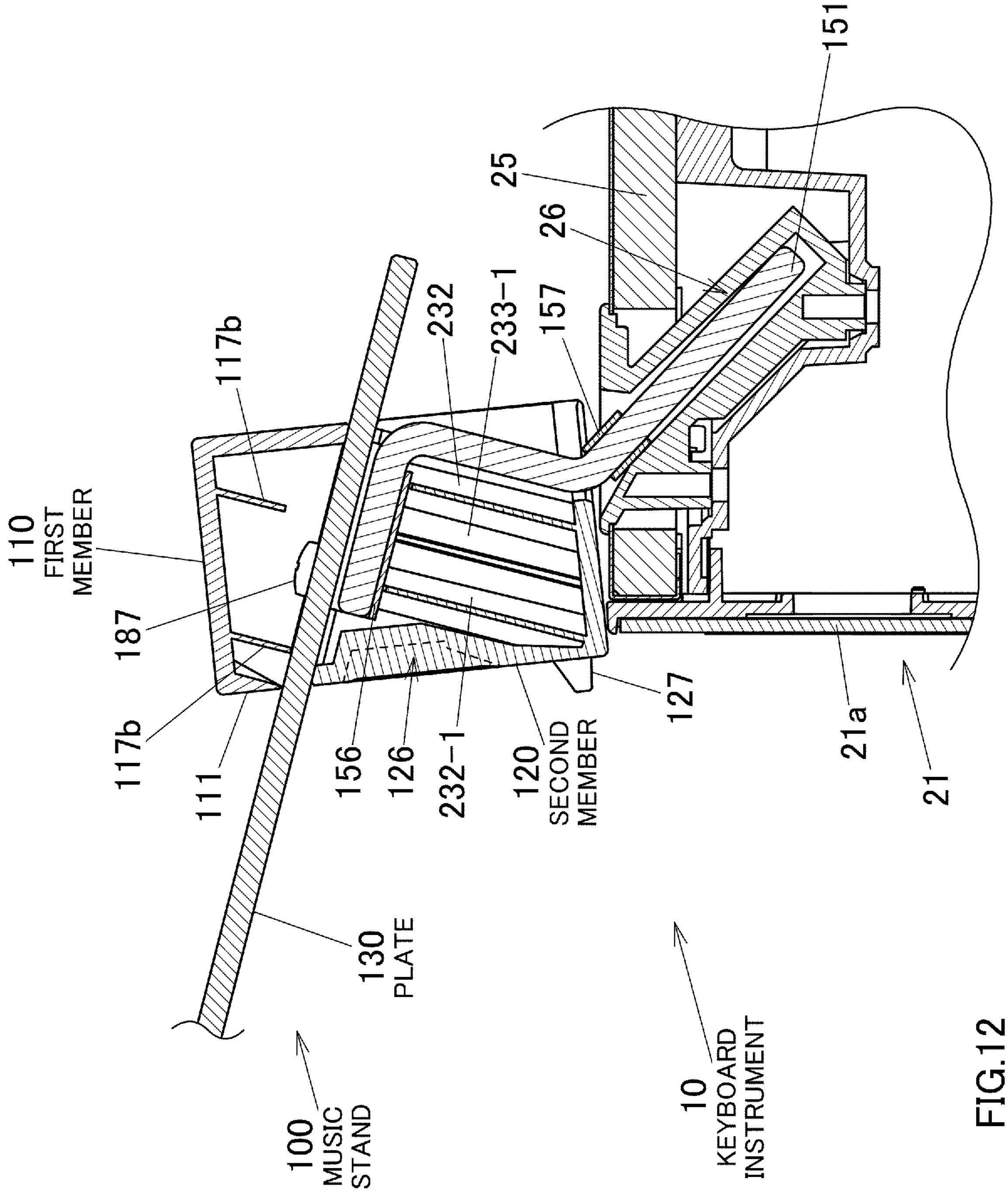
FIG. 12 is a sectional view corresponding to the sectional view of the keyboard instrument according to the embodiment of the present disclosure taken along the line XI-XI in FIG. 1 with the part of the internal structure of the keyboard instrument main body omitted from illustration.

As shown in FIG. 12, in the event that the keyboard instrument 10 falls down to the front side F, the slip prevention members 157, which are attached to the insertion rods 151, are brought individually into abutment with inner circumferential surfaces in the vicinity of openings of the music stand attachment portions 26, whereby the music stand 100 is made difficult to forcibly dash out to the front side F.

Thus, as has been described heretofore, according to the embodiment of the present disclosure, the music stand 100 includes the plate 130 having the through holes 131, the first member 110 which is disposed on one side of the front surface or the back surface of the plate 130 and having the projecting portions 116 which are configured to be passed through the through holes 131, and the second member 120 which is disposed on another side of the front surface or the back surface of the plate 130 and having the recessed portions 200 which corresponds to the projecting portions 116.

As a result, the plate 130 can be disposed between the first member 110 and the second member 120, and the highly strong structure can be provided by the engagement of the projecting portions 116 with the corresponding recessed portions 200 while allowing the music stand 100 to have the favorable design characteristic. Therefore, an excellent music stand 100 can be provided.

At the time of placement, the plate 130 is inclined in such a manner that the lower side Lo of the plate 130 is positioned closer to the player's side than the upper side Up of the plate 130, and the first member 110 and the second member 120 sandwich the inclined plate 130 therebetween. As a result, the form can be provided in which the plate 130 is sandwiched by the first member 110 and the second member 120 therebetween, whereby the high design characteristics can be provided.

The first member 110 is formed into the rectangular trapezoidal shape in its side view, and the second member 120 is formed into the inverted rectangular trapezoidal shape in its side view which includes the oblique side which faces the oblique side of the regular trapezoidal shape of the first member 110 in its side view. As a result, the first member 110 and the second member 120 are connected together into the substantially rectangular parallelepiped box shape, and the plate 130 can be disposed in this substantially rectangular parallelepiped box shaped portion, thereby making it possible to provide the music stand 100 of the high design characteristics.

In the music stand 100, the second member 120 is disposed on the front surface side of the plate 130, and the first member 110 is disposed on the back surface side of the plate 130. As a result, the recessed portions 200 are disposed on the front surface side of the plate 130, and the projecting portions 116 are disposed on the back surface side of the plate 130, whereby the strength is enhanced, and the screw members 188 are provided in the positions where the screw members 188 can be concealed, thereby making it possible to provide the music stand 100 of the high design characteristics.

The recessed portions 200 individually include the resisting portions 204 which resist the own weight of the first member 110 which is transmitted from the projecting portions 116 included in the first member 110 which is disposed on the back surface side of the plate 130. As a result, even in the case that a thick set of sheets of musical notation or a relatively heavy tablet-type PC is rested on the music stand 100, the plate 130 can be supported by the resisting portions 204 via the first member 110, whereby the damage to the members involved is mitigated.

The projecting portion 116 has the first connecting member which connects the second member 120 and the first member 110 together. As a result, the configuration can be provided in which the projecting portion 116 is passed through the corresponding through hole 131 in the plate 130 so as to be inserted into the corresponding recessed portion 200 of the second member 120, whereby the second member 120 and the first member 110 can be connected together with the simple configuration without separately providing a configuration for connecting the first member 110 and the second member 120 together.

In addition, the second member 120 includes the recessed groove 126 which is provided on the top surface, and the long projecting portion 127 which is the elongated projecting portion which is provided parallel to the recessed groove 126 on the side closer to the player's side than the recessed groove 126. As a result, the long projecting portion 127 can be used to prevent the slippage or sliding of the sheet music or the tablet-type PC rested on the music stand 100.

Then, since the keyboard instrument 10, which is the musical instrument, includes the music stand 100, the good keyboard instrument 10 can be provided which facilitates the use of a thick set of musical notation and a tablet-type PC which can display sheet music thereon and which has high design characteristics.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A music stand comprising:

a plate comprising a through hole;

a first member comprising a projecting portion that is configured to extend through the through hole in the plate, wherein the projecting portion comprises a fastener receiving portion;

a second member comprising a recessed portion corresponding to the projecting portion of the first member, wherein the recessed portion comprises a fastener opening;

a fastener member that is advanced into the fastener receiving portion from a lower side of the recessed portion via the fastener opening for connecting the first member and the second member together; and an attachment member secured to at least one of the plate and the second member and including an insertion rod configured for being inserted into an attachment portion of a musical instrument for mounting the music stand to the musical instrument.

2. The music stand according to claim 1, wherein the first member is configured to be disposed on one side of a front surface or a back surface of the plate;

wherein the second member is configured to be disposed on another side of the front surface or the back surface of the plate.

3. The music stand according to claim 1, wherein the plate has a front surface configured for supporting music sheets thereagainst and a back surface opposite the front surface with the plate being disposed in an inclined state in which a lower side of the plate is positioned more forwardly than an upper side of the plate, and wherein the first member and the second member sandwich the inclined plate therebetween.

4. The music stand according to claim 3, wherein the first member has a trapezoidal shape in a side view of the first member, and wherein the second member has an inverted trapezoidal shape in a side view of the second member which includes an oblique side which faces an oblique side of the trapezoidal shape of the first member in the side view of the first member.

5. The music stand according to claim 1, wherein the second member is disposed on a front surface side of the plate, and the first member is disposed on a back surface side of the plate.

6. The music stand according to claim 5, wherein the recessed portion comprises a resisting portion configured to resist a weight of the first member which is transmitted from the projecting portion included in the first member which is disposed on the back surface side of the plate.

7. The music stand according to claim 1, wherein the plate has a front surface configured for supporting music sheets thereagainst and a back surface opposite the front surface, and the second member comprises a recessed groove which is provided on a top surface and an elongated projecting portion which is provided parallel to the recessed groove more forwardly than the recessed groove.

8. A musical instrument comprising the music stand according to claim 1.

9. The music stand according to claim 1, wherein the attachment member includes a fixing member configured for being fastened to the plate and the second member, the fixing member including a concave portion in which the insertion rod is disposed.

10. The music stand according to claim 1, wherein the second member includes a cut out through which the insertion rod extends.

11. The music stand according to claim 1, wherein the insertion rod includes a slip-prevention member attached thereto.

12. A music stand comprising:

a plate comprising a front surface configured for supporting music sheets thereagainst, a back surface opposite the front surface, and a through hole extending between the front surface and the back surface, wherein the plate is inclined such that a lower side of the plate is positioned more forwardly than an upper side of the plate;

a first member disposed on the back surface of the plate, and comprising a projecting portion configured to extend through the through hole in the plate;

a second member disposed on the front surface of the plate, and comprising a recessed portion corresponding to the projecting portion of the first member, wherein the recessed portion comprises a resisting portion which resists a weight of the first member and a load exerted on the plate toward the first member which are transmitted from the projecting portion; and an attachment member secured to at least one of the plate and the second member and including an insertion rod configured for being inserted into an attachment portion of a musical instrument for mounting the music stand to the musical instrument.

13. The music stand according to claim 12, wherein the first member and the second member sandwich the inclined plate therebetween.

14. The music stand according to claim 12, wherein the first member has a trapezoidal shape in a side view of the first member, and wherein the second member has an inverted trapezoidal shape in a side view of the second member which includes an oblique side which faces an oblique side of the trapezoidal shape of the first member in the side view of the first member.

15. The music stand according to claim 12, wherein the projecting portion comprises a first connecting portion for connecting the second member and the first member together.

16. The music stand according to claim 12, wherein the second member comprises a recessed groove which is provided on a top surface and an elongated projecting portion which is provided parallel to the recessed groove more forwardly than the recessed groove.

17. A musical instrument comprising the music stand according to claim 12.

18. The music stand according to claim 12, wherein the attachment member includes a fixing member configured for being fastened to the plate and the second member, the fixing member including a concave portion in which the insertion rod is disposed.

19. The music stand according to claim 12, wherein the second member includes a cut out through which the insertion rod extends.

20. The music stand according to claim 12, wherein the insertion rod includes a slip-prevention member attached thereto.

* * * * *